(12) United States Patent
Otaki et al.

(10) Patent No.: US 11,579,316 B2
(45) Date of Patent: Feb. 14, 2023

(54) RADIATION DETECTING DEVICE

(71) Applicant: KONICA MINOLTA, INC., Tokyo (JP)

(72) Inventors: Junichiro Otaki, Hachioji (JP); Takafumi Matsuo, Hino (JP); Makoto Sumi, Tokorozawa (JP); Hajime Ishimoto, Hachioji (JP); Masaki Suzuki, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 17/218,083

(22) Filed: Mar. 30, 2021

(65) Prior Publication Data
US 2021/0325551 A1    Oct. 21, 2021

(30) Foreign Application Priority Data
Apr. 16, 2020  (JP) .............................. JP2020-073196

(51) Int. Cl.
G01T 1/14 (2006.01)
G01T 1/24 (2006.01)

(52) U.S. Cl.
CPC ................ G01T 1/24 (2013.01); G01T 1/244 (2013.01)

(58) Field of Classification Search
CPC .................................. G01T 1/24; G01T 1/244
See application file for complete search history.

(56) References Cited

U.S. PATENT DOCUMENTS

| 2009/0014659 | A1* | 1/2009 | Hennessy | ............. G01T 1/2018 378/189 |
| 2015/0293237 | A1 | 10/2015 | Suzuki et al. | |
| 2022/0018976 | A1* | 1/2022 | Bogumil | ............. G01T 1/20189 |

FOREIGN PATENT DOCUMENTS

| JP | 2015200606 A | 11/2015 |
| JP | 2019196944 A | 11/2019 |

* cited by examiner

Primary Examiner — Hugh Maupin
(74) Attorney, Agent, or Firm — Holtz, Holtz & Volek PC

(57) ABSTRACT

A radiation detecting device includes a radiation detector and a supporter. The radiation detector includes a substrate that has flexibility and a semiconductor element formed on an imaging surface of the substrate. The supporter is formed of foam and supports the radiation detector.

20 Claims, 9 Drawing Sheets

RADIATION DETECTING DEVICE

CROSS-REFERENCE TO RELATED APPLICATIONS

The entire disclosure of Japanese Patent Application No. 2020-073196 filed on Apr. 16, 2020 is incorporated herein by reference in its entirety.

BACKGROUND

Technological Field

The present disclosure relates to a radiation detecting device.

Description of Related Art

There is known a radiation detecting device that includes a substrate and semiconductor elements formed on the imaging surface of the substrate.

The substrate of the known radiation detecting device is mainly made of glass. In imaging a subject, the radiation detecting device may be placed under the subject lying on the bed, and the subject may be irradiated from above. The radiation detecting device may bend owing to the weight of the subject, and the substrate in the radiation detecting device may be broken.

The substrate may also be broken when the radiation detecting device receives an impact by being hit or dropped accidentally while being carried.

To make the substrate more resistant to damage when the radiation detecting device is pressed or hit, structures to support the substrate have been developed.

For example, JP2019-196944A discloses a radiation imaging apparatus that includes a sensor panel, a supporter that supports the sensor panel, and a casing that houses the sensor panel and the supporter. The supporter has a vacant space and supports the lower surface of the sensor panel without a gap in the thickness direction and in the surface direction.

Further, according to a radiation imaging apparatus disclosed in JP2015-200606A, a housing of the radiation imaging apparatus has a supporting surface to support a radiation detection panel. The supporting surface is included in an inner surface of the bottom of the housing on a side of the radiation detection panel. On a side of the bottom opposite the side of the radiation detection panel, a concave portion is formed. The concave portion is defined by part of the outer surface of the bottom of the housing, and an electrical component is arranged in the concave portion.

SUMMARY

According to the known radiation detecting device disclosed in JP2019-196944A and JP2015-200606A, however, the supporter needs to have a certain degree of rigidity or greater to support and protect the glass substrate against loads and impacts.

To ensure the rigidity of the supporter, the supporter needs to be thick, or at least part of the supporter (e.g., surface layer part) needs to be made of a material having a high degree of rigidity, such as fiber reinforced resin or metal.

Ensuring the rigidity of the supporter as described above increases the weight of the supporter, thereby increasing the weight of the radiation detection device.

The substrate made of glass, which is a relatively heavy material, makes the radiation detecting device further heavier.

The present disclosure has been made in view of the above issues. Objects of the present disclosure include reducing the weight of a radiation detecting device that includes a substrate and semiconductor elements formed on the surface of the substrate while keeping the substrate resistant against loads and impacts.

To achieve at least one of the abovementioned objects, according to an aspect of the present disclosure, there is provided a radiation detecting device, including: a radiation detector that includes a flexible substrate and a semiconductor element formed on an imaging surface of the substrate; and a supporter that is formed of foam and that supports the radiation detector.

BRIEF DESCRIPTION OF DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein.

DESCRIPTION OF EMBODIMENTS

Hereinafter, one or more embodiments of the present invention will be described with reference to the drawings. However, the present invention is not limited to the disclosed embodiments.

First Embodiment

A first embodiment of the present invention is described.

A schematic configuration of a radiation detecting device in this embodiment (hereinafter called a detecting device 100) is described.

Figure 1:
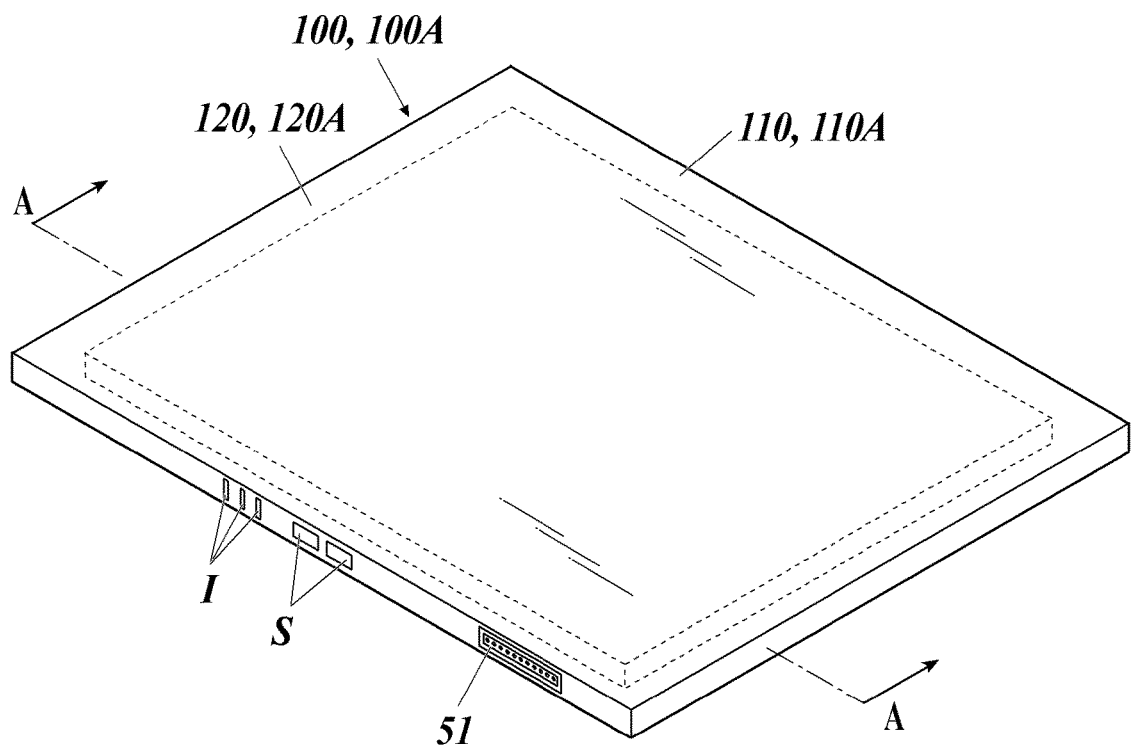
FIG. 1 is a perspective view of a radiation detecting device according to first and second embodiments of the present invention.
Figure 2:
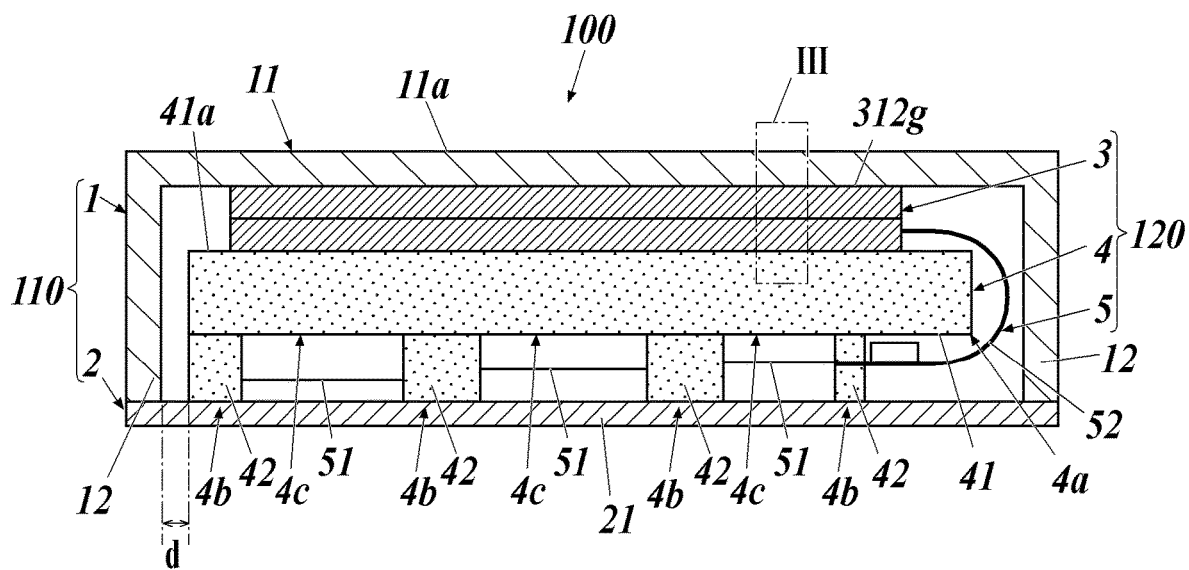
FIG. 2 is an A-A cross-sectional view of the radiation detecting device in FIG. 1 in the first embodiment.
Figure 3:
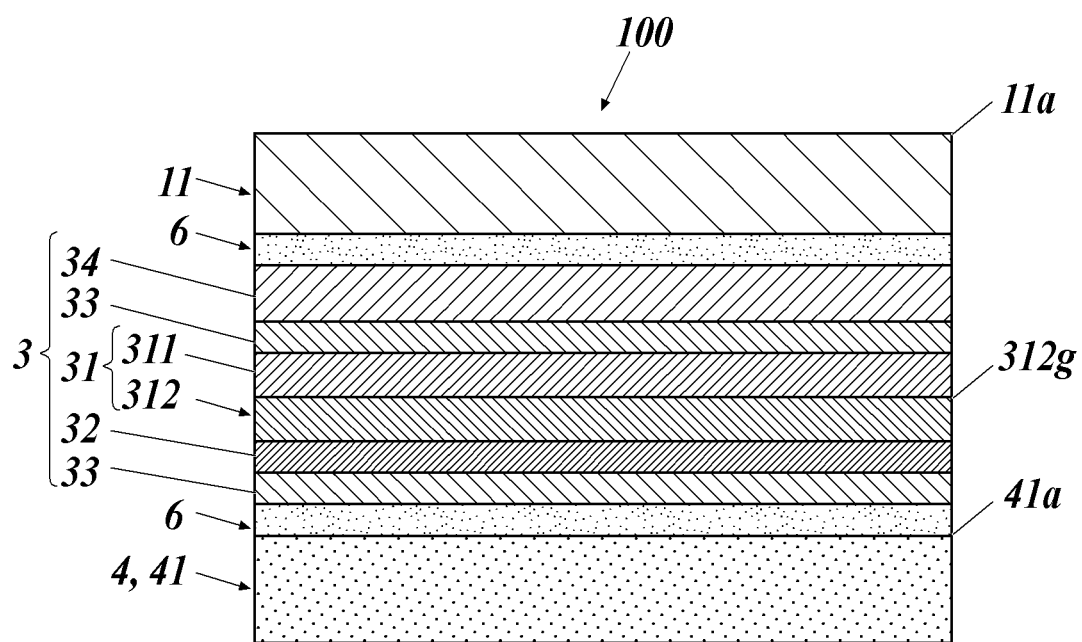
FIG. 3 is a cross-sectional view of part of FIG. 2.
Figure 4:
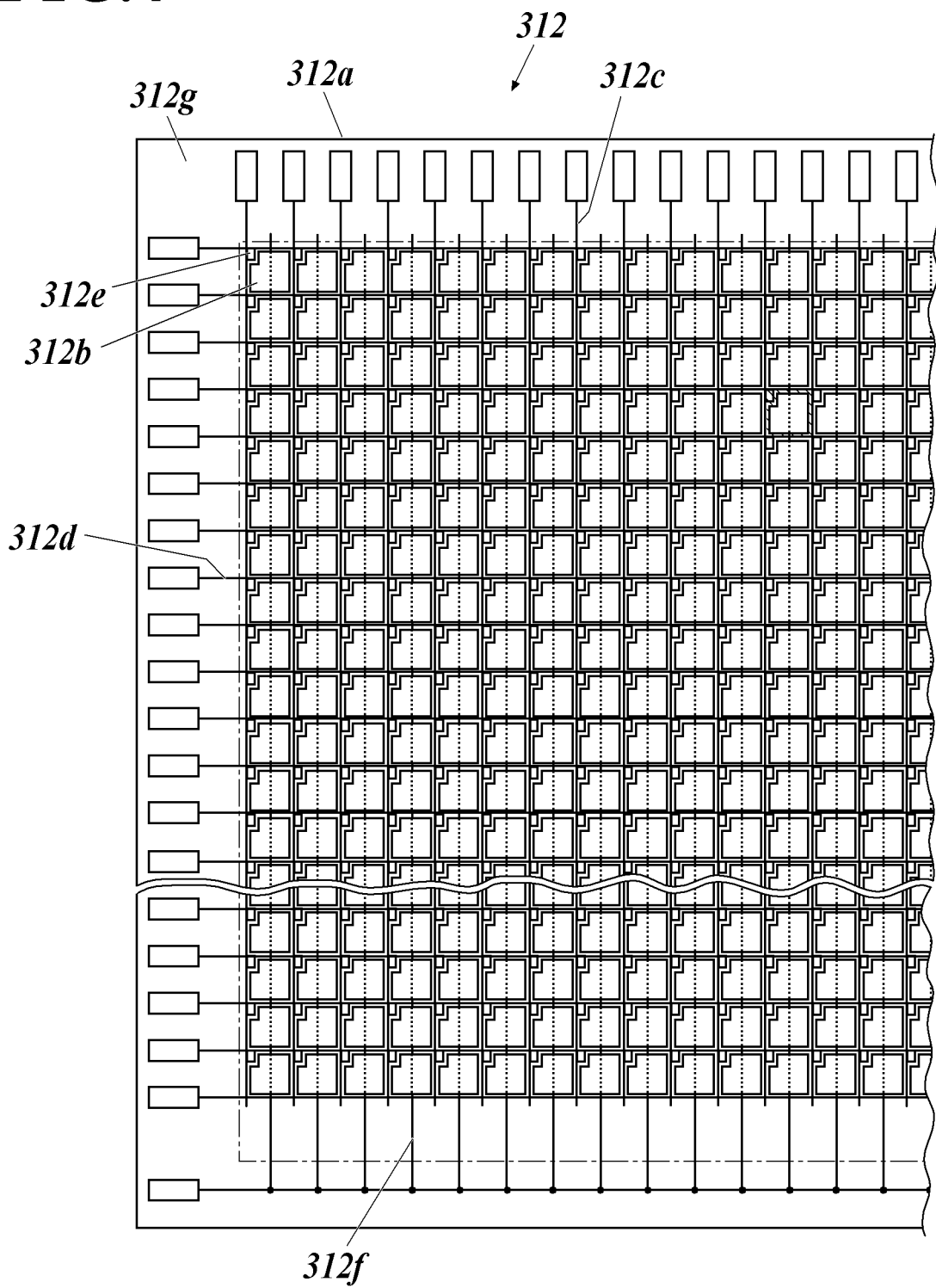
FIG. 4 is a plan view of part of the radiation detecting device (light-electricity converter) in FIG. 1 as an example.
Figure 6:
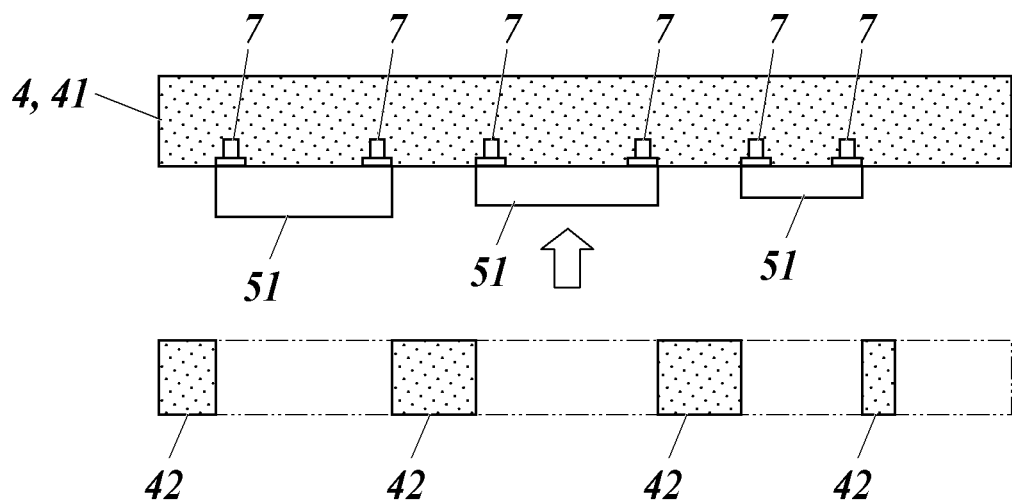
FIG. 6 is a lateral view of the radiation detecting device in FIG. 1 in the production process.
Figure 7:
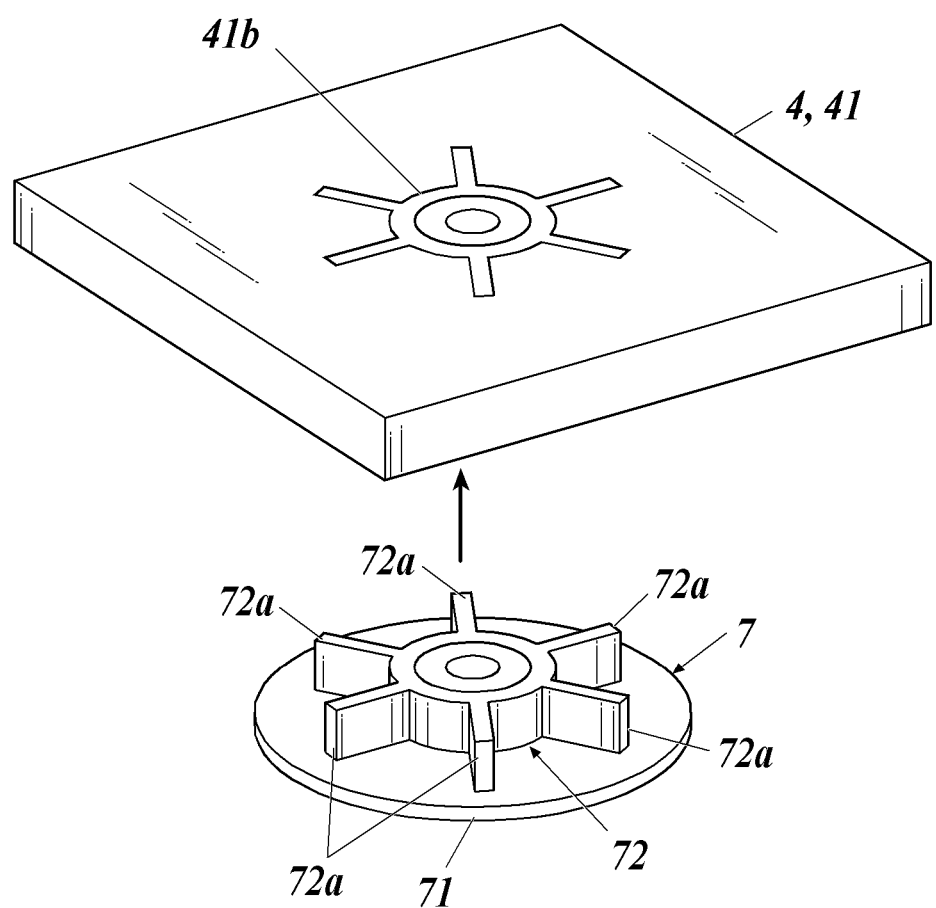
FIG. 7 is a perspective view of the radiation detecting device in FIG. 1 in the production process.
Figure 8A:
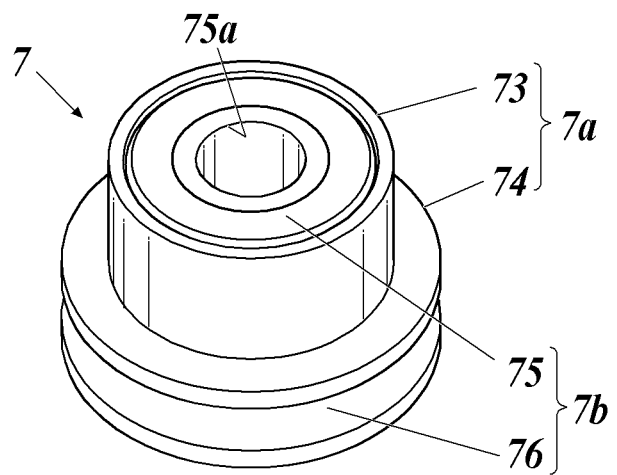
FIG. 8A is a perspective view of an attaching member as an example.
Figure 8B:
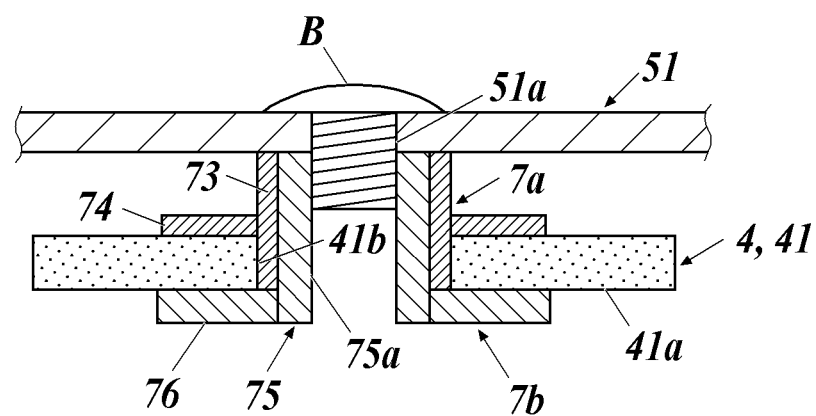
FIG. 8B is a cross-sectional view of the attaching member in FIG. 8A fixed to the supporter.
Figure 9A:
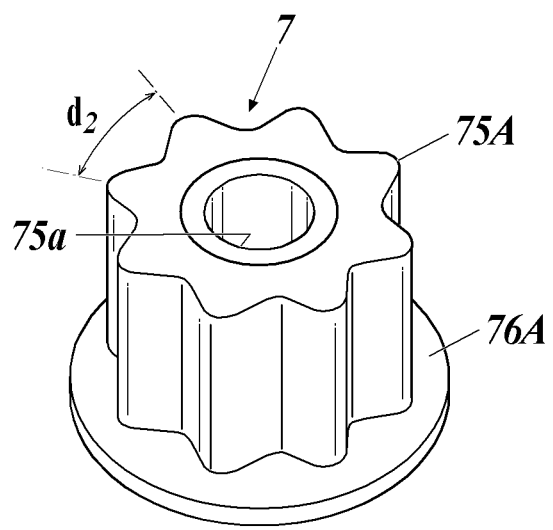
FIG. 9A is a perspective view of the attaching member as an example.
Figure 9B:
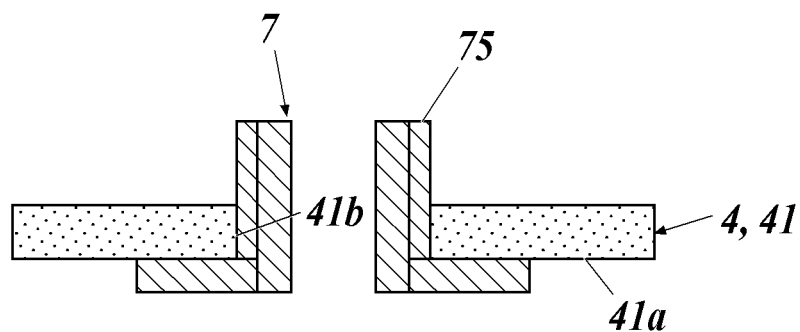
FIG. 9B is a cross-sectional view of the attaching member in FIG. 9A fixed to the supporter.
Figure 10A:
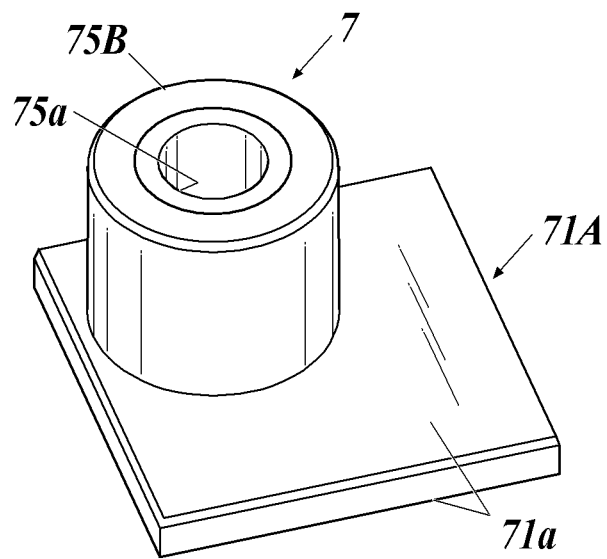
FIG. 10A is a perspective view of the attaching member as an example.

FIG. 1 is a perspective view of the detecting device 100. FIG. 2 is an A-A cross-sectional view of the detecting device 100. FIG. 3 is a cross-sectional view of part of FIG. 2 (part shown in III in FIG. 2). FIG. 4 is a plan view of part of the detecting device 100 (light-electricity converter). FIG. 5 is a lateral view of a supporter 4 included in the detecting device 100 as an example. FIG. 6 is a lateral view of the detecting device 100 in the production process. FIG. 7 is a perspective view of the detecting device 100 in the production process. FIGS. 8A, 9A, 10A are perspective views of examples of an attaching member. FIGS. 8B, 9B, 10B, 10C, 10D are cross-sectional views of the respective attaching members in FIGS. 8A, 9A, 10A fixed to the supporter. FIG. 11 is a perspective view of an example of the attaching member.

Reference numerals in parentheses in the figures are for the second embodiment to be described later.

The detecting device 100 is for generating a radiographic image in response to receiving radiation.

The detecting device 100 includes, for example, a casing 110 and an internal module 120, as shown in FIG. 1.

In this embodiment, the detecting device 100 further includes various switches S, such as a power supply switch and control switch, and an indicator I.

[1. Casing]

The casing 110 houses the internal module 120.

The casing 110 includes a box body 1 and a lid body 2, as shown in FIG. 2.

The casing 110 in this embodiment has a shape of a rectangular panel.

[1-1. Box Body]

The box body 1 in this embodiment includes a front part 11 and a lateral part 12 that are formed integrally.

The front part 11 and the lateral part 12 may be different members.

(1-1-1. Front Part)

The front part 11 faces an imaging surface 312g included in the internal module 120, which is described later, and spreads in parallel with the imaging surface 312g.

The outer surface of the front part 11 is a radiation entrance surface 11a of the detecting device 100 (the front surface of the casing 110).

The front part 11 in this embodiment is formed to be a rectangular plate.

On the radiation entrance surface 11a in this embodiment, an effective image region of a sensor panel 31 is shown with a frame (not illustrated). The effective image region is a region in which semiconductor elements 312b are arranged.

The front part 11 is made of a material that allows radiation to pass through.

The casing 110 in this embodiment is made of carbon fiber reinforced plastic/resin (CFRP), glass fiber reinforced plastic/resin (GFRP), light metal, or light metal-containing alloy.

The casing 110 may be made of carbon fiber reinforced thermoplastic (CFRTP) resin.

When the material of the casing 110 is CFRP, CFRTP, or GFRP, the casing 110 may be formed of a sheet molding compound (SMC). The SMC is a material that includes fibers shorter than fibers of a prepreg.

Examples of the light metal include aluminum and magnesium that have a relatively small density.

Using the above-described materials can reduce the weight of the casing 110 while keeping the rigidity of the casing 110.

The CFRP in particular has a high radiation transmissivity and allows radiation that has passed through a subject to reach the internal module 120 without decrease. Making the casing 110 of CFRP therefore improves the image quality of the radiographic image than making the casing 110 of other materials.

(1-1-2. Lateral Part)

The lateral part 12 extends from the edge portions of the front part 11 towards a rear part 21 in a direction orthogonal to the radiation entrance surface 11a.

The outer surface of the lateral part 12 is the lateral surface of the detecting device 100 (casing 110).

[1-2. Lid Body]

The lid body 2 includes the rear part 21.

In this embodiment, the whole lid body 2 constitutes the rear part 21.

The rear part 21 faces the front part 11 of the box body 1 with the internal module 120 inbetween and spreads in parallel with the front part 11.

The outer surface of the rear part 21 is the rear surface of the detecting device 100 (casing 110).

The rear part 21 in this embodiment is formed to have substantially the same rectangle shape as the front part 11.

The rear part 21 in this embodiment is made of CFRP, GFRP, light metal, or light metal-containing alloy.

The material of the rear part 21 may be the same as or different from the material of the box body 1.

The lid body 2 (rear part 21) abuts the lateral part 12 of the box body 1 and is attached to the lateral part 12.

The lateral part 12 thus connects the front part 11 and the rear part 21.

In this embodiment, the lid body 2 is screwed on the box body 1.

In repairing or doing maintenance of the detecting device 100, the rear part 21 can be separated from the front part 11 and the lateral part 12 by loosening and removing screws. A person who does maintenance of the detecting device 100 can therefore easily access the internal module 120, which is housed in the front part 11 and the lateral part 12.

To make the casing 110 watertight, the box body 1 and the lid body 2 may be fixed to each other with screws with a gasket inbetween or may be adhered to each other. The watertight casing 110 can prevent foam from absorbing water and affecting the sensor panel and electrical components.

[1-3. Others]

The front part 11 and the lateral part 12 of the casing 110 (box body 1) are formed integrally in FIG. 1. Instead, the lateral part 12 and the rear part 21 of the casing 110 may be formed integrally. Further, the front part 11, the lateral part 12, and the rear part 21 may be different members.

Both the front part 11 and the rear part 21 may include a lateral part.

Further, although the casing 110 in FIG. 1 includes the box body 1 and the lid body 2, the casing 110 may include a tubular body and a lid body. The tubular body has the front part 11, the rear part 21, and a pair of lateral parts 12 that connect the edges of the front part 11 and the edges of the rear part 21. The lid body covers the opening of the tubular body.

The casing 110 may have recess portions at the edge portions of the rear part 21. A person carrying the detecting device 100 can hook his/her fingers on the recess portions to hold the detecting device 100 more securely, so that the person is less likely to drop the detecting device 100.

The casing 110 may be antimicrobial-treated on the entire surface, or an antimicrobial material may be kneaded in the material of the casing 110.

Further, the casing 110 may be provided with protecting members on the corners (at least the four corners of the front part 11 or the four corners of the rear part 21).

The material of the protecting members may be metal or elastic body, such as resin, rubber, or elastomer because the detecting device 100 in this embodiment is light and receives a smaller impact when being hit.

At least one of the protecting members may have a different color and/or form from the color and/or form of the other protecting members. The protecting member having a different color and/or form allows a user to easily recognize the orientation of the detecting device 100.

[2. Internal Module]

The Internal module 120 is fixed to at least one of the inner surface of the front part 11, the inner surface of the rear part 21, and the inner surface of the lateral part 12 of the casing 110.

In this embodiment, the internal module 120 is fixed to the inner surface of the front part 11, as shown in FIG. 2.

The internal module 120 may be fixed to the casing 110 by gluing with a glue, adhesion with an adhesive tape, fitting a recess part to a projecting part formed on inner surfaces, or engaging with engaging parts formed on inner surfaces.

Fixing the internal module 120 can prevent the internal module 120 from moving when the detecting device 100 receives an impact in a direction substantially orthogonal to the lateral surface of the detecting device 100.

The internal module 120 may be fixed to the inner surface of the rear part 21 or the inner surface of the lateral part 12.

The internal module 120 may be fixed to the inner surfaces of the front part 11 and the rear part 21, or the inner surfaces of the front part 11 and the lateral part 12, or the inner surfaces of the lateral part 12 and the rear part 21.

The internal module 120 may be fixed to the inner surfaces of the front part 11, the lateral part 12, and the rear part 21.

The internal module 120 in this embodiment is separate from the inner surface of the lateral part 12 by a distance d1. That is, a gap having the width of d1 or greater is present between the internal module 120 and the lateral part 12.

The gap can prevent the internal module 120 from bumping into the lateral part 12 of the detecting device 100 and being broken when the detecting device 100 receives an impact in a direction substantially orthogonal to the lateral surface of the detecting device 100.

The internal module 120 includes a radiation detector 3 and a supporter 4.

The internal module 120 in this embodiment further includes an electrical component 5.

[2-1. Radiation Detector]

The radiation detector 3 is placed between the front part 11 of the casing 110 and the supporter 4.

In this embodiment, the radiation detector 3 is placed between the front part 11 of the casing 110 and the supporter 4 via adhesive layers 6.

The radiation detector 3 includes the sensor panel 31, as shown in FIG. 3.

The radiation detector 3 in this embodiment further includes a radiation shielding layer 32, an electromagnetic-field shielding layer 33, and a cushioning material 34.

(2-1-1. Sensor Panel)

The sensor panel 31 in this embodiment is placed between the radiation shielding layer 32 and the electromagnetic-field shielding layer 33.

The sensor panel 31 includes a wavelength converter 311 and a light-electricity converter 312.

The wavelength converter 311 is for converting radiation into visible lights or other lights.

The wavelength converter 311 in this embodiment is placed between the electromagnetic-field shielding layer 33 and the light-electricity converter 312.

The wavelength converter 311 in this embodiment spreads in parallel with the radiation entrance surface 11a of the casing 110.

The wavelength converter 311 in this embodiment includes a supporting layer and a phosphor layer, which are not illustrated.

The supporting layer is made of flexible material in a film shape (thin plate).

Examples of the flexible material include polyethylene naphthalate, polyethylene terephthalate (PET), polycarbonate, polyimide, polyamide, polyetherimide, aramid, polysulfone, polyether sulfone, fluororesin, polytetrafluoroethylene (PTFE), and composite material that is a mixture of at least two materials among the above materials.

Polyimide, polyamide, polyetherimide, PTFE, or composite material of these materials are particularly preferable among the above materials for improving heat resistance.

The supporting layer in this embodiment is formed to be rectangular.

The phosphor layer is formed of a phosphor on the surface of the supporting layer.

The phosphor is a substance that glows as a result of excitation of atoms when being irradiated with ionizing radiation, such as $\alpha$-rays, $\gamma$-rays, and X-rays. The phosphor converts radiation into ultraviolet rays or visible lights.

As the phosphor, column crystals of cesium iodide (CsI) can be used, for example.

The phosphor layer in this embodiment is formed on the whole surface of the supporting layer that faces the light-electricity converter 312.

That is, the wavelength converter 311 is formed to be rectangular.

The thickness of the phosphor layer in this embodiment is set such that the phosphor layer can bend (deform elastically) when the supporting layer bends.

The wavelength converter 311 formed as described above is a flexible plate. When the wavelength converter 311 is irradiated, the irradiated region glows at an intensity corresponding to the dose of received radiation.

The light-electricity converter 312 is for converting light into electric signals.

The light-electricity converter 312 in this embodiment is placed between the wavelength converter 311 and the radiation shielding layer 32.

The light-electricity converter 312 in this embodiment is placed so as to spread in parallel with the wavelength converter 311.

The light-electricity converter 312 is adhered to the wavelength converter 311.

The light-electricity converter 312 includes a substrate 312a and multiple semiconductor elements 312b, as shown in FIG. 4.

The light-electricity converter 312 in this embodiment includes scanning lines 312c, signal lines 312d, switch elements 312e, and bias lines 312f.

The substrate 312a is made of a flexible material in a film shape (thin plate).

The substrate 312a in this embodiment has substantially the same rectangular shape as the wavelength converter 311 when viewed from the front.

The substrate 312a in this embodiment is made of the same material as the supporting layer of the wavelength converter 311.

More specifically, the substrate 312a in this embodiment has flexibility, and the thermal expansion coefficient and the thermal contraction coefficient of the substrate 312a are the same as the thermal expansion coefficient and the thermal contraction coefficient of the supporting layer.

Because the light-electricity converter 312 and the wavelength converter 311 together expand with heat, the laminate of the light-electricity converter 312 and the wavelength converter 311 is less likely to warp. As a result, a glowing part of the wavelength converter 311 is less likely to shift from the position of the semiconductor element 312b that faces the glowing part. This can prevent decrease in quality of radiographic images.

The substrate 312a may be made of material that is different from the material of the supporting layer and that has the same thermal expansion coefficient and thermal contraction coefficient as those of the supporting layer.

The semiconductor elements 312b generate electric charges corresponding to the intensity of received lights.

The semiconductor elements 312b are arranged two-dimensionally on the surface of the substrate 312a. More specifically, the semiconductor elements 312b are arranged in a matrix on the surface of the substrate 312a that abuts (that is adhered to) the wavelength converter 311.

The semiconductor elements 312b in this embodiment are arranged in a matrix at the central part of the imaging surface 312g. More specifically, on the surface of the substrate 312a, the scanning lines 312c (not illustrated) are formed so as to extend in parallel with each other at regular intervals, and the signal lines 312d (not illustrated) are formed at regular intervals so as to orthogonally cross the scanning lines 312c. The semiconductor elements 312b are arranged in the respective rectangular regions defined by the scanning lines 312c and the signal lines 312d. The rectangular regions correspond to pixels in a radiographic image.

Each of the rectangular regions also includes a switch element 312e. The switch element 312e consists of a thin film transistor (TFT), for example. The gate of the switch element 312e is connected to the scanning line 312c. The source of the switch element 312e is connected to the signal line 312d. The drain of the switch element 312e is connected to the semiconductor element 312b.

The surface of the substrate 312a on which the semiconductor elements 312b are formed is hereinafter called an imaging surface 312g.

The light-electricity converter 312 formed as described above is flexible and placed such that the imaging surface 312g, on which the semiconductor elements 312b are formed, faces the wavelength converter 311.

(2-1-2. Radiation Shielding Layer)

The radiation shielding layer 32 is for preventing scattered radiation from reaching the electric circuits 51.

The radiation shielding layer 32 in this embodiment is placed between the sensor panel 31 (light-electricity converter 312) and the electromagnetic-field shielding layer 33, as shown in FIG. 3.

The radiation shielding layer 32 in this embodiment fixes the sensor panel 31 with an attaching part (not illustrated).

(2-1-3. Electromagnetic-Field Shielding Layer 33)

The electromagnetic-field shielding layer 33 is for shielding noises.

The electromagnetic-field shielding layer 33 is provided at a side where the imaging surface 312g of the radiation detector 3 is provided (imaging surface-side) and/or the opposite side from the imaging surface-side.

In this embodiment, the electromagnetic-field shielding layer 33 is provided at the imaging surface-side and the opposite side from the imaging surface-side.

The electromagnetic-field shielding layer 33 provided at the opposite side from the imaging surface-side may be adhered to the supporter 4.

The electromagnetic-field shielding layer 33 is a laminate. Part of the electromagnetic-field shielding layer 33 includes a conductive material.

The electromagnetic-field shielding layer 33 in this embodiment may be a resin film on which a metal layer is formed, or a film made of a transparent conductive material, such as indium tin oxide (ITO).

The metal may be aluminum or copper, for example.

Methods of forming the metal layer include pasting metal foils and depositing metal.

As the electromagnetic-field shielding layer 33, a film, such as the AL-PET (registered trademark of Panac Co., Ltd.) is suitable.

At least one layer of the electromagnetic-field shielding layers 33 is provided at one side.

The electromagnetic-field shielding layer 33 provided at the imaging surface-side can shield external noises entering from the front surface side.

The electromagnetic-field shielding layer 33 provided at the opposite side from the imaging surface-side can shield noises generated by the electric circuits 51.

The electromagnetic-field shielding layer 33 may be connected to the ground (GRD), for example. Connecting the electromagnetic-field shielding layer 33 to the ground keeps the electric potentials of the electromagnetic-field shielding layer 33 constant, thereby further improving the noise-shielding effect.

In the case, it is preferable to interpose a metal (e.g., nickel) the ionization tendency of which is not so different from the ionization tendency of aluminum or copper.

Such a metal may be interposed as a coating of an intermediate member or as a conductive filament in a conductive tape, for example.

When metals the ionization tendencies of which are largely different (e.g., aluminum and copper) come into contact, electrolytic corrosion may occur. Using metals the ionization tendencies of which are not so different can prevent electrolytic corrosion.

(2-1-4. Cushioning Material)

The cushioning material 34 is for absorbing external loads and impacts.

The cushioning material 34 in this embodiment is placed between the front part 11 of the casing 110 and the electromagnetic-field shielding layer 33. The cushioning material 34 can therefore prevent external loads and impacts coming from the side of the front part 11 from reaching the sensor panel 31.

[2-2. Supporter]

The Supporter 4 is for supporting the radiation detector 3. "Supporting" includes supporting the radiation detector 3 against load coming from the side of the front part 11 and supporting the radiation detector 3 placed on the supporter 4.

As shown in FIG. 2, the supporter 4 is provided between the radiation detector 3 and the rear part 21 to disperse external loads on the casing 110. The supporter 4 can therefore prevent the radiation detector 3 (sensor panel 31) from bending.

The supporter 4 is formed of foam.

Examples of the foam include polyethylene, polypropylene, polystyrene, modified-polyphenyleneether, polyurethane, acrylic, epoxy, and composite material of at least two materials among these resins.

Soft resin typically has a lower degree of rigidity than hard resin. On the other hand, it is known that the foam made of soft resin has a higher degree of rigidity when the expansion ratio of the foam is lower. The foam can have a desired degree of rigidity by adjusting the expansion ratio of the foam in production process.

It is preferable that the expansion ratio be equal to or less than 30 times. The supporter 4 can therefore keep desired rigidity without using a material the degree of rigidity of which is higher than the degree of rigidity of foam (e.g., fiber reinforced resin or metal) for part of the supporter 4 (e.g., surface layer part). Further, the supporter 4 can be light.

The supporter 4 may be made of resin the thermal expansion coefficient of which is the same as the thermal expansion coefficient of the sensor panel 31, or may be made of resin the thermal expansion coefficient of which is different from the thermal expansion coefficient of the sensor panel 31 by a certain degree or less.

Further, the supporter 4 may have elasticity.

The sensor panel 31 has a greater thermal expansion coefficient than a known sensor panel that includes a glass substrate. According to the above, when the sensor panel 31 expands, the supporter 4 also expands as much as the sensor panel 31 or deforms elastically to absorb the expansion of the sensor panel 31. This can prevent wrinkles on the sensor panel 31 that occur when only the sensor panel 31 expands.

The supporter 4 includes a first part 4a and a second part 4b.

The first part 4a is placed without a gap along the opposite surface of the light-electricity converter 312 of the sensor panel 31 from the imaging surface 312g. More specifically, the first part 4a is placed along the surface of the electromagnetic-field shielding layer 33 or the surface of the adhesive layer 6 provided at the opposite side from the imaging surface-side, where the imaging surface 312g of the light-electricity converter 312 is provided.

The first part 4a has a predetermined width in the direction orthogonal to the opposite surface from the imaging surface 312g. The first part 4a has a plate shape and extends in parallel with the opposite surface from the imaging surface 312g. With the first part 4a, the supporter 4 can further disperse external loads on the casing 110 to prevent the radiation detector 3 from bending.

The second part 4b is provided between the radiation detector 3 and the rear part 21 such that no gap is present.

With the second part 4b, the supporter 4 can further disperse external loads on the casing 110 to prevent the radiation detector 3 from bending.

The supporter 4 also has a recess part 4c as well as the first part 4a and the second part 4b on the surface facing the rear part 21 of the casing 110.

The width, length, and depth of the recess part 4c are set such that the electric circuit 51 can be housed.

The supporter 4 in this embodiment has multiple recess parts 4c, or at least as many recess parts 4c as the number of electric circuits 51.

The supporter 4 in this embodiment is divided into multiple parts, namely includes the first supporter 41 and the second supporter 42.

(2-2-1. First Supporter)

A surface of the first supporter 41 abuts the radiation detector 3, and the other surface of the first supporter 41 abuts the electric circuits 51.

The first supporter 41 in this embodiment corresponds to the above-described first part 4a.

The surface of the first supporter 41 that abuts the radiation detector 3 is flat in this embodiment, and is hereinafter called a supporting surface 41a.

The supporting surface 41a in this embodiment is as large as the sensor panel 31 or is one size larger than the sensor panel 31, so that the first supporter 41 can support the whole body of the sensor panel 31.

It is preferable that the width of the first supporter 41 (distance between the supporting surface 41a and the opposite surface from the supporting surface 41a) be within 2 to 5 millimeters, so that the first supporter 41 has a space for housing the electric circuits 51 to be described later while keeping rigidity.

The first supporter 41 in this embodiment includes two types of foam that have different degrees of rigidity.

The first supporter 41 in this embodiment includes a first foam F1 and a second foam F2.

The first foam F1 constitutes the surface layer part that is in contact with the radiation detector 3 and/or the second supporter 42.

The second foam F2 constitutes the core part that is in contact with the surface layer part in a direction in which the radiation detector 3 and the second supporter 42 are arranged.

Accordingly, the expansion ratio of the first supporter 41 changes in a direction orthogonal to the supporting surface 41a.

The expansion ratio of the first foam F1 is less than the expansion ratio of the second foam F2. The degree of rigidity of the first foam F1 is therefore higher than the degree of rigidity of the second foam F2.

The first supporter 41 described above has an improved degree of rigidity against bending, and eventually improves the rigidity of the detecting device 100 against bending.

Figure 5A:
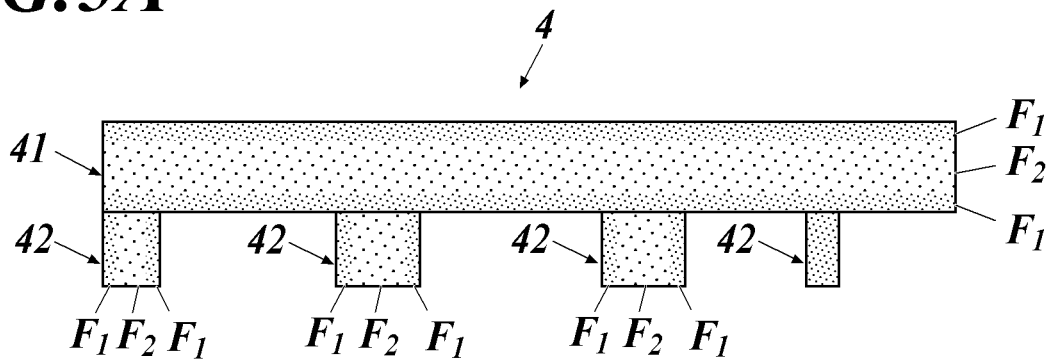
FIGS. 5A and 5B are lateral views of a supporter of the radiation detecting device in FIG. 1 as an example.

Although the first supporter 41 in FIG. 2 and FIG. 5A has a uniform thickness (uniform width in the direction orthogonal to the supporting surface 41a), the first supporter 41 may have thicker edge portions along the supporting surface 41a than the central portion. Such a first supporter 41 can further improve rigidity against loads and impacts.

Alternatively, the central portion of the first supporter 41 may be thicker than the edge portions.

(2-2-2. Second Supporter)

A surface of the second supporter 42 is in contact with the first supporter 41, and the other surface of the second supporter 42 is in contact with the rear part 21, as shown in FIG. 2.

The first supporter 41 and the second supporter 42 in this embodiment are different members, as shown in FIG. 6.

The second supporter 42 in this embodiment extends towards the rear part 21 from part of the opposite surface of the first supporter 41 from the supporting surface 41a. The part of the opposite surface is not in contact with the electric circuits 51 to be described later.

Different from the first supporter 41, the second supporter 42 is formed so as to fill part of a space along the opposite surface of the light-electricity converter 312 from the imaging surface 312g. More specifically, the second supporter 42 fills part of a space along the surface of the electromagnetic-field shielding layer 33 or the surface of the adhesive layer 6 provided at the opposite surface-side of the light-electricity converter 312 from the imaging surface 312g. The recess parts 4c are formed at the side of the rear part 21 in a direction along the supporting surface 41a.

The second supporter 42 in this embodiment includes two types of foam that have different degrees of rigidity, as with the first supporter 41.

The second supporter 42 in this embodiment includes the first foam F1 and the second foam F2, as shown in FIG. 5A.

The first foam F1 of the second supporter 42 constitutes a surface layer part that extends from the first supporter 41 towards the rear part 21.

The second foam F2 of the second supporter 42 constitutes a core part that is in contact with the surface layer part in a direction along the inner surface of the rear part 21.

The expansion ratio of the second supporter 42 therefore changes in a direction along the supporting surface 41a. The distribution of the expansion ratio of the second supporter 42 is different from the distribution of the expansion ratio of the first supporter 41.

The second supporter 42 as described above has an improved degree of rigidity against loads coming from a direction orthogonal to the supporting surface 41a. Accordingly, the detecting device 100 can has an improved degree of rigidity against loads coming from a direction orthogonal to the rear/front surface of the detecting device 100.

(2-2-3. Supporter and Other Members)

In this embodiment, the directions in which the first foam F1 and the second foam F2 are arranged are different between the first supporter 41 and the second supporter 42. Accordingly, the first supporter 41 and the second supporter 42 are strong in different directions. In such a case, the rigidity against loads and impacts coming from the thickness direction (direction orthogonal to the supporting surface 41a) may be greater than the rigidity against loads and impacts coming from the direction along the supporting surface 41a.

Further, only either the first supporter 41 or the second supporter 42 may be formed of the first foam F1 and the second foam F2, and the other supporter may be formed of only the first foam F1 or the second foam F2.

Further, both the first supporter 41 and the second supporter 42 may be formed of only the first foam F1 or the second foam F2.

Figure 5B:
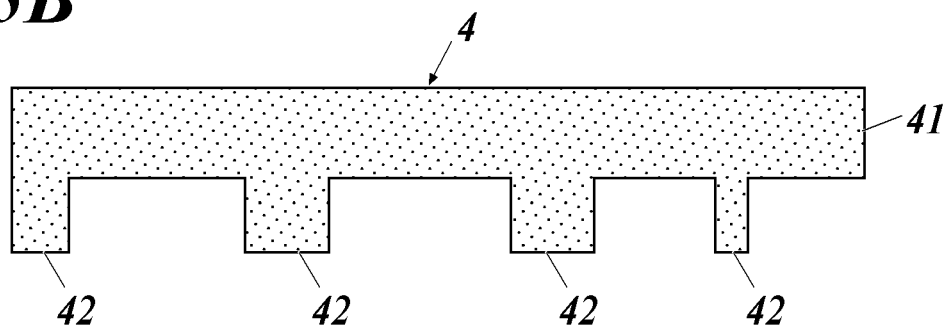

Further, the first supporter 41 and the second supporter 42 of the supporter 4 may be integrally formed of a uniform piece of foam, as shown in FIG. 5B.

The recess parts 4c may be formed by cutting the parts where the recess parts 4c are supposed to be or by partly pressing the supporter 4. It is preferable, however, that the recess part 4c be formed by pressing part of the supporter 4.

The parts of the supporter 4 where the recess parts 4c are formed are thinner than the other parts of the supporter 4 (second part 4b). More specifically, the width of the parts where the recess parts 4c are formed is less than the width of the other parts of the supporter 4 in the direction orthogonal to the supporting surface 41a. When the recess parts 4c are formed by pressing part of the supporter 4, the surfaces of the recess parts 4c have a lower expansion ratio and therefore have higher rigidity. The recess parts 4c of the supporter 4 can therefore be as rigid as the second parts 4b.

The supporter 4 may be formed by laminating multiple sheets of foam.

[2-3. Electrical Component]

The electrical component 5 includes the electric circuits 51 and a wire(s) 52 shown in FIG. 2 and a heat diffusion sheet (not illustrated).

The electric circuits 51 in this embodiment are attached to the supporter 4.

The radiation detector 3, the supporter 4, and the electric circuits 51 are fixed to each other to constitute the internal module 120.

(2-3-1. Electric Circuit)

The electric circuits 51 are positioned on the opposite surface of the supporter 4 from the supporting surface 41a.

The electric circuits 51 are housed in the recess parts 4c of the supporter 4 between the second supporters 42.

The electric circuits 51 are separate from the rear part 21 of the casing 110, so that the electric circuits 51 can avoid receiving external loads placed on the casing 110.

The electric circuits 51 include a scanning circuit, reading circuit, wireless communication circuit, control circuit, power-source circuit, battery, and connector.

The scanning circuit controls switch elements.

The reading circuit reads electric charges as signals.

The wireless communication circuit is for wirelessly communicating with other devices.

The control circuit controls the circuits to generate image data.

The power-source circuit is for applying voltage to semiconductor elements and supplying electricity for the above-described circuits.

The connector can accept a cable for communicating with other devices, as shown in FIG. 1.

(2-3-2. Attaching Electric Circuit to Supporter)

The electric circuits 51 in this embodiment are attached to the supporter 4 with the attaching members 7, as shown in FIG. 6.

Each of the attaching members 7 in this embodiment includes a plate part 71 that is in contact with the electric circuit 51 and a projecting part 72, as shown in FIG. 7.

The first supporter 41 of the supporter 4 has a fitting hole(s) 41b the contour of which is the same as the contour of the projecting part 72.

The projecting part 72 in this embodiment has radial parts 72a that spread radially from the center of the plate part 71 in the radial direction of the plate part 71. Such a projecting part 72 has greater friction against the supporter 4 when being fitted to the supporter 4. As a result, the attaching member 7 is less likely to detach from the supporter 4.

When the attaching member 7 is screwed on the electric circuit 51, the attaching member 7 receives torque. The radial parts 72a protruding in a direction orthogonal to the torque can prevent the attaching member 7 from turning as the screw turns.

Further, the radial parts 72a reduce pressure on the supporter 4 by engaging with the supporter 4 on a predetermined area or greater. Large torque can therefore be applied to the supporter 4 without damaging the foam, which has a low degree of rigidity, in screwing the electric circuit 51 on the supporter 4. The screw can therefore be prevented from being loose.

The structure of the attaching member 7 is not limited to the structure described above.

For example, the attaching member 7 may include a first member 7a and a second member 7b, as shown in FIG. 8A.

The first member 7a of the attaching member 7 includes a tube part 73 and a flange part 74.

The tube part 73 fits the fitting hole 41b formed on the first supporter 41.

The flange part 74 abuts the supporting surface 41a of the supporter 4.

The second member 7b includes an internal-screw part 75 and a flange part 76.

The second member 7b may be made of the same foam as the supporter 4. The internal-screw part 75 fits the tube part 73.

In the central part of the internal-screw part 75, an insert screw 75a is inserted. Alternatively, an internal screw may be directly formed on the internal-screw part 75.

The flange part 76 abuts the supporting surface 41a of the first supporter 41. The attaching member 7 sandwiches the supporter 4 between the flange part 74 and the flange part 76.

When the second member 7b is made of foam, the second member 7b can be connected to the supporter 4 with the heat generated in forming the supporter 4.

The internal-screw part 75 accepts a screw B through the screw hole 51a of the electric circuit 51, so that the electric circuit 51 is fixed to the supporter 4.

A ground wire(s) of the electric circuit 51 is extended around the screw hole 51a. The ground wire is fastened with the screw B along with the electric circuit 51, thereby being connected to the ground terminal near the screw hole 51a.

The attaching member 7 may include an internal-screw part 75A and a flange part 76A, as shown in FIG. 9.

The flange part 76A of the attaching member 7 abuts the supporting surface 41a of the supporter 4.

The internal-screw part 75A fits the fitting hole 41b formed on the first supporter 41.

The internal-screw part 75A has a wavy outer circumferential surface.

The distance d2 between the tops of the waves is equal to or greater than the diameter of a particle of the foam, so that the particles of the foam constituting the supporter 4 enter the spaces between the waves of the internal-screw part 75A. The attaching member 7 is therefore prevented from turning along with the screw B when receiving torque from the screw B being turned to fix the electric circuit 51.

Further, the attaching member 7 may include an internal-screw part 75B and a plate part 71A, as shown in FIG. 10A.

The internal-screw part 75B may be cylindrical as shown in FIG. 10, or may have a wavy lateral circumferential surface as shown in FIG. 9.

The plate part 71A has a connecting surface 71a the area of which is sufficiently wider than the width of the internal-screw part 75.

Figure 10B:
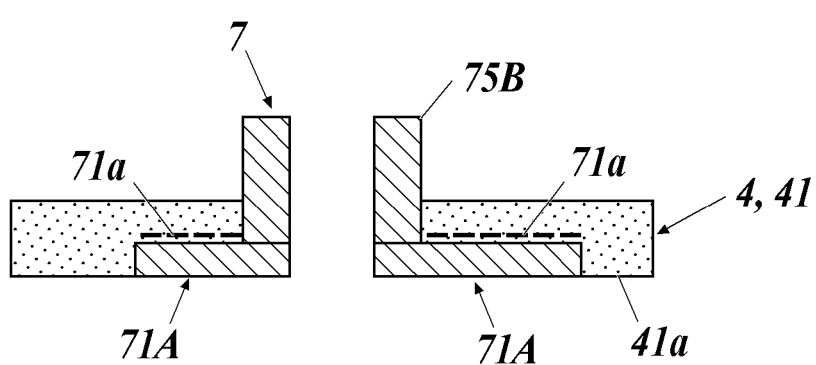
FIGS. 10B to 10D are cross-sectional views of the attaching member in FIG. 10A fixed to the supporter.
Figure 11:
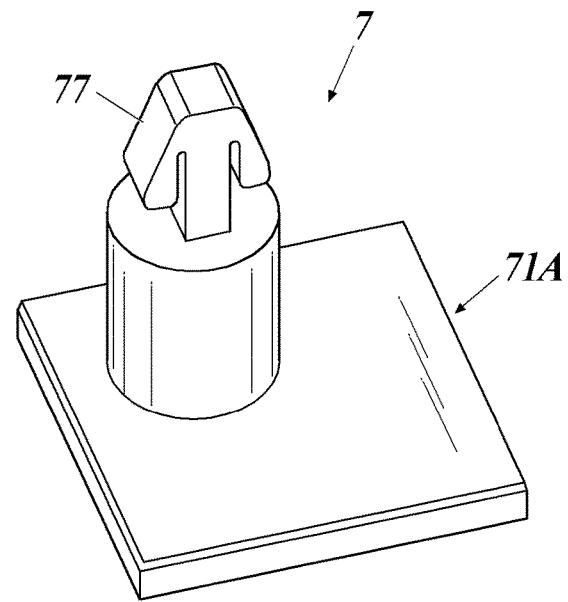
FIG. 11 is a perspective view of the attaching member as an example.

The connecting surface 71a of the plate part 71A is adhered to the first supporter 41, as shown in FIG. 10B.

Figure 10C:
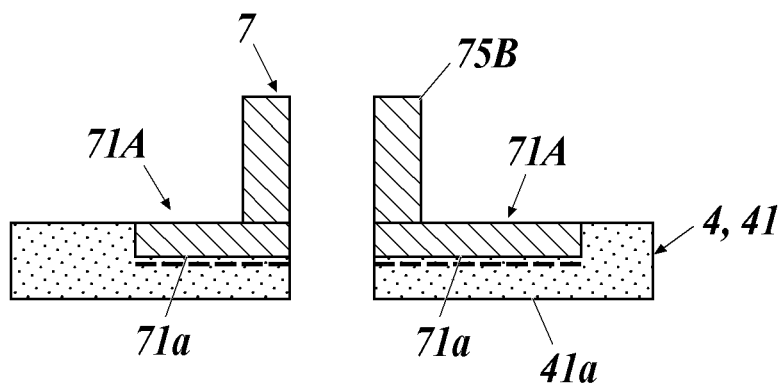

Instead, a surface of the plate part 71 of the attaching member 7 may be connected to the first supporter 41, the surface being opposite from the surface on which the internal-screw part 75b is provided, as shown in FIG. 10C.

Figure 10D:
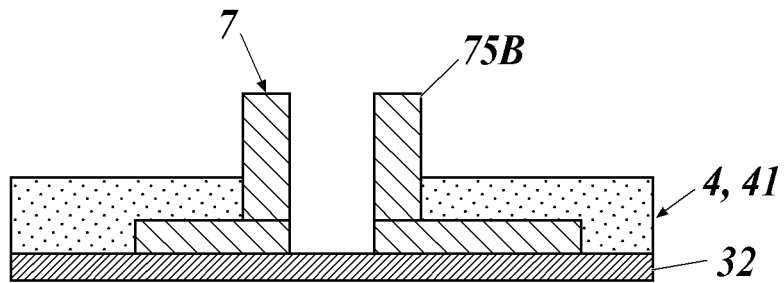

Further, the attaching member 7 may be connected to the radiation shielding layer 32, as shown in FIG. 10D.

Further, the attaching member 7 may include an engaging part 77, as shown in FIG. 11.

The engaging part 77 engages with the screw hole 51a formed on the electric circuit 51 by a snap-fit.

As the foam constituting the supporter 4 is not resistant to torque, the attaching member 7 may turn when being screwed on the electric circuit 51. With the snap-fit, the supporter 4 can be easily engaged with and attached to the electric circuit 51.

The attaching member 7 may not be used in attaching the electric circuit 51 to the supporter 4.

The electric circuit 51 may be directly fixed to the supporter 4 with a glue or an adhesive tape.

As the electric circuit 51 is not fixed together with the wires, the connectors may be connected with wires of conductive tapes, for example.

(2-3-3. Wire)

The wires 52 are made of flexible printed circuits, for example. The wires 52 connect the light-electricity converter 312 and the electric circuits 51.

More specifically, the wires 52 connect (i) the terminals of the scanning lines (switch elements) and the scanning circuit, (ii) the terminals of the signal lines (semiconductor elements 312b) and the reading circuit, and (iii) the terminals of the bias lines and the power-source circuit of the light-electricity converter 312.

(2-3-4. Heat Diffusion Sheet)

The heat diffusion sheet is positioned so as to face, among elements constituting the electric circuit 51, elements that generate heat when the electric circuit 51 is in operation.

The positions to face the elements include the rear surfaces of the electric circuits 51, the supporter 4, and the casing 110.

The heat diffusion sheet diffuses heat generated by the elements to prevent overheat of the elements and decrease in functions of the elements.

The heat diffusion sheet also prevents occurrence of heat spots in regions facing the elements.

The heat diffusion sheet may face the elements with a heat transferring member inbetween.

Second Embodiment

Next, the second embodiment of the present invention is described. In the second embodiment, components that are the same as the components of the first embodiment are denoted by the same reference numerals, and description thereof is omitted.

Figure 12:
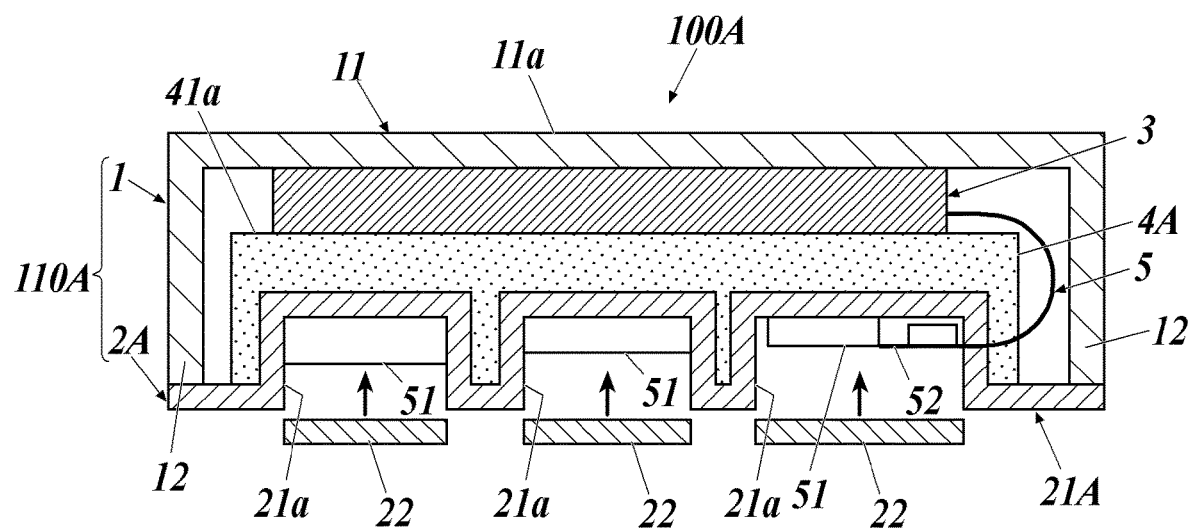
FIG. 12 is an A-A cross-sectional view of the radiation detecting device in FIG. 1 in the second embodiment.

FIG. 12 is an A-A cross-sectional view of a radiation detecting device (hereinafter called detecting device 100A) in this embodiment.

The structure of the casing 110A of the detecting device 100A in this embodiment is different from the structure of the casing 110 in the first embodiment.

[3. Lid Body]

A lid body 2A in this embodiment includes a rear part 21A and lids 22.

[3-1. Rear Part]

The rear part 21A has recess parts 21a.

The recess parts 21a are recessed towards the inside of the casing 110A from the outer surface of the rear part 21A.

The lateral surfaces of the recess parts 21a have slits (not illustrated).

The width, length, and depth of each of the recess parts 21a are set such that the electric circuit 51 can be housed.

In this embodiment, the rear part 21A has as many recess parts 21a as the number of electric circuits 51. The bottom surfaces of the recess parts 21a (the surface closest to the front part 11) are flat in this embodiment.

The parts between the recess parts 21a of the rear part 21A constitute the inner walls of the recess parts 21a and function as ribs along the rear surface of the rear part 21A. The ribs can prevent the casing 110 from bending or twisting when the detecting device 100 receives loads.

[3-2. Lids]

The lids 22 are configured to fit the opening parts of the recess parts 21a.

When the lids 22 in this embodiment fit the recess parts 21a, the electric circuits 51 housed in the recess parts 21a are covered, and the outer surfaces of the lids 22 are flush with the outer surface of the rear part 21.

It is preferable that the material and thickness of the lids 22 be the same as the material and thickness of the rear part 21A so that the lid body 2A has a uniform degree of rigidity at the lids 22 and at the rear part 21A.

To eliminate difference in rigidity between the lids 22 and the rear part 21A, the lids 22 may be formed to be thinner than the rear part 21A from a material the degree of rigidity of which is higher than the degree of rigidity of the rear part 21A, or may be formed to be thicker than the rear part 21A from a material the degree of rigidity of which is lower than the degree of rigidity of the rear part 21A.

Carbon fiber reinforced resin or metals, which have high conductivity and high degree of rigidity, can be used to release heat of the electric circuits. Alternatively, resin, which have low degrees of rigidity and transmit radio waves, can be used so that the detecting device 100A is suited for wireless communication.

The lids 22 may have gaskets at the edge portions. The gaskets prevent dusts and liquids from entering into the recess parts 21a to protect the electric circuits 51.

The lids 22 in this embodiment are attachable to and removable from the rear part 21A, so that the electric circuits 51 can be easily accessed in maintenance of the detecting device 100A.

[4. Supporter]

The supporter 4A supports the radiation detector 3 with the supporting surface 41a. The opposite surface of the supporter 4A from the supporting surface 41a is in contact with the inner surface of the rear part 21A of the casing 110A.

The supporter 4A in this embodiment fills the whole space between the radiation detector 3 and the rear part 21A in the casing 110, except a space beyond the radiation detector 3 in a direction along the imaging surface 312g and a space near the inner surface of the lateral part 12. The shape of the surface of the supporter 4A that is in contact with the rear part 21A is therefore the same as the shape of the rear part 21A.

The supporter 4A and the rear part 21A may be formed integrally, or the supporter 4A may be fixed to the rear part 21A.

Methods of fixing the supporter 4A to the rear part 21A include gluing with a glue, adhesion with an adhesive tape, fitting a projecting part(s) of the supporter 4A to a recess part(s) of the rear part 21A, and fitting a projecting part(s) of the rear part 21A to s recess part(s) of the supporter 4A.

[5. Electronic Component] The electric circuits 51 in this embodiment are housed in the recess parts 21a of the rear part 21A.

In this embodiment, the electric circuits 51 are fixed to the bottom surfaces of the recess parts 21a.

Methods of fixing the electric circuits 51 to the rear part 21A in this embodiment include fixing with the attaching member 7, gluing with a glue, and adhesion with an adhesive tape.

The electric circuits 51 are separate from the lids 22 of the casing 110A to avoid receiving external loads on the casing 110A.

The wires 52 in this embodiment are passed through the slits of the recess parts 21a.

Advantageous Effects

The detecting device 100/100A has the sensor panel 31 that has flexibility. The flexible sensor panel 31 is less likely to be damaged when the casing 110/100A receives loads or impacts.

The sensor panel 31 is also lighter than a known sensor panel because flexible materials are typically lighter than glass.

With the light and damage-resistant sensor panel 31, the supporter 4/4A that supports the sensor panel 31 does not need a high degree of rigidity as compared with a known supporter. Accordingly, the supporter 4/4A can be made of a less amount of material than the known supporter and may not be made of high-rigidity material (e.g., metals or fiber reinforced resin) like the known supporter. This reduces the weight of the supporter 4/4A.

The supporter 4/4A made of foam is further lighter.

As a result, the detecting device 100/100A is light and can hold the substrate resistant against damages when being pressed or hit.

The sensor panel 31 (flexible material) has low heat conductivity. When the sensor panel 31 receives a large amount of heat from the electric circuits 51, the sensor panel 31 may not diffuse the heat and may have locally hot spots. The sensor panel 31 having partly different temperatures may generate an uneven radiographic image.

The detecting device 100/100A, on the other hand, includes the supporter 4 (first supporter 41) between the electric circuits 51 and the sensor panel 31. The supporter 4/4A is made of foam, which typically has high heat-insulating properties. The supporter 4 placed between the electric circuits 51 and the sensor panel 31 can therefore prevent the heat generated by the electric circuits 51 from being transmitted to the sensor panel 31.

The supporter 4/4A also has gaps (recess parts 4c), and the heat generated by the electric circuits 51 escapes into the gaps. Accordingly, the supporter 4 can further prevent the heat from being transmitted to the sensor panel 31.

The sensor panel 31 (flexible material) may easily change its shape. When part of the sensor panel 31 changes its shape and comes closer to the electric circuits 51, the sensor panel 31 may be affected by noises generated by the electric circuits 51.

The detecting device 100/100A, on the other hand, supports the sensor panel 31 with the supporter 4/4A made of foam. As the foam is light, the supporter 4 can be made thick without greatly increasing its weight. The thick supporter 4/4A can keep the distance between the sensor panel 31 and the electric circuits 51 even when the sensor panel 31 changes its shape. The supporter 4/4A thus can prevent the sensor panel 31 from being affected by the noises of the electric circuits 51.

The sensor panel 31 (flexible material) is susceptible to low-frequency vibration. When the vibration arrives at the sensor panel 31, the sensor panel 31 may increase the amplitude and may be more likely to generate noises.

The detecting device 100/100A, on the other hand, supports the sensor panel 31 with the supporter 4/4A made of foam. The foam absorbs low-frequency vibration. The supporter 4/4A can therefore prevent the sensor panel 31 from being affected by low-frequency vibration.

The effect of restraining vibration is greater as the filing rate of the supporter 4/4A in the casing 110/110A is greater.

Although embodiments of the present invention have been described and illustrated in detail, the disclosed embodiments are made for purposes of illustration and example only and not limitation. The scope of the present invention should be interpreted by terms of the appended claims.

What is claimed is:

1. A radiation detecting device, comprising:
a radiation detector that includes a flexible substrate and a semiconductor element formed on an imaging surface of the substrate;
a supporter that is formed of foam and that supports the radiation detector;
a casing that houses the radiation detector, the casing including a front part facing the imaging surface and a rear part facing the front part with the radiation detector arranged therebetween; and
an electric circuit;
wherein:
the supporter is placed between the radiation detector and the rear part,
the supporter includes:
a first supporter having (i) a front-facing surface that is in contact with a rear-facing surface of the radiation detector and (ii) a rear-facing surface that is in contact with the electric circuit, and
a second supporter comprising a plurality of extending parts that extend from the rear-facing surface of the first supporter to the rear part, wherein each of the extending parts has (i) a front-facing surface that is in contact with the rear-facing surface of the first supporter at a portion of the rear-facing surface where the electric circuit is not provided, (ii) a lateral surface that faces the electric circuit, and (iii) a rear-facing surface that is in contact with the rear part of the casing, and
a recess part in which the electric circuit is arranged, wherein the recess part is defined by a portion of the rear-facing surface of the first supporter that is in contact with the electric circuit and the lateral surfaces of adjacent extending parts among the extending parts of the second supporter, the lateral surfaces of the adjacent extending parts facing each other with the electric circuit arranged therebetween.

2. The radiation detecting device according to claim 1, wherein part of the supporter is placed without a gap between the radiation detector and the rear part.

3. The radiation detecting device according to claim 1, wherein part of the supporter is placed without a gap along an opposite surface of the radiation detector from the imaging surface.

4. The radiation detecting device according to claim 1, wherein the electric circuit is attached to the supporter.

5. The radiation detecting device according to claim 4, wherein
the radiation detector, the supporter, and the electric circuit are fixed to each other and constitute an internal module, and
the internal module is fixed to at least one among an inner surface of the front part, an inner surface of the rear part, and an inner surface of a lateral part that connects the front part and the rear part.

6. The radiation detecting device according to claim 1, further comprising:
a heat diffusion sheet positioned so as to face an element among elements constituting the electric circuit, the element generating heat when the electric circuit is active.

7. The radiation detecting device according to claim 1, wherein the casing is made of carbon fiber reinforced resin, glass fiber reinforced resin, light metal, or a light metal-containing alloy.

8. The radiation detecting device according to claim 1, further comprising at least one electromagnetic-field shielding layer placed at at least one of an imaging surface-side and an opposite surface-side from the imaging surface-side.

9. The radiation detecting device according to claim 1, wherein the supporter is formed of at least two types of foam that have different degrees of rigidity.

10. The radiation detecting device according to claim 9, wherein:
the first supporter includes:
a first foam constituting a surface layer part that is in contact with at least one of the radiation detector and the second supporter, and
a second foam constituting a core part that is in contact with the surface layer part in a direction in which the radiation detector and the second supporter are arranged, and
an expansion ratio of the first foam is less than an expansion ratio of the second foam.

11. The radiation detecting device according to claim 9, wherein:
the second supporter includes:
a first foam constituting a surface layer part that extends from the first supporter to the rear part, and
a second foam constituting a core part that is in contact with the surface layer part in a direction in which an inner surface of the rear part extends, and
an expansion ratio of the first foam is less than an expansion ratio of the second foam.

12. The radiation detecting device according to claim 1, wherein the supporter is integrally formed of one piece of foam.

13. A radiation detecting device, comprising:
a radiation detector that includes a flexible substrate and a semiconductor element formed on an imaging surface of the substrate;
a supporter that is formed of foam and that supports the radiation detector;
a casing that houses the radiation detector, the casing including a front part facing the imaging surface, a rear part facing the front part with the radiation detector arranged therebetween, and a lid; and
an electric circuit;
wherein:
the supporter is placed between the radiation detector and the rear part,
the rear part has a recess part that is recessed towards an inside of the casing from an outer surface of the rear part, and the lid is configured to fit an opening part of the recess part;
the electric circuit is housed in the recess part and enclosed therein by the lid covering the opening part, an outer surface of the lid being flush with an outermost portion of the outer surface of the rear part,
the supporter has a front-facing surface that faces the radiation detector and an opposite surface that is in contact with an inner surface of the rear part,
the opposite surface of the supporter has a same shape as the rear part such that the supporter fills a whole space between the radiation detector and the inner surface of the rear part in a direction in which the radiation detector and the supporter are arranged, and
the rear part of the casing is interposed between the supporter and the electric circuit housed in the recess part.

14. The radiation detecting device according to claim 13, further comprising:
a heat diffusion sheet positioned so as to face an element among elements constituting the electric circuit, the element generating heat when the electric circuit is active.

15. The radiation detecting device according to claim 13, wherein the casing is made of carbon fiber reinforced resin, glass fiber reinforced resin, light metal, or a light metal-containing alloy.

16. The radiation detecting device according to claim 13, further comprising at least one electromagnetic-field shielding layer placed at at least one of an imaging surface-side and an opposite surface-side from the imaging surface-side.

17. The radiation detecting device according to claim 13, wherein the supporter is formed of at least two types of foam that have different degrees of rigidity.

18. The radiation detecting device according to claim 17, wherein:
the supporter includes:
a first supporter having the front-facing surface that is in contact with the radiation detector and another surface that is in contact with the rear part, said another surface constituting a first part of the opposite surface of the supporter, and
a second supporter having a surface that is in contact with the first supporter and another surface that is in contact with the rear part, said another surface constituting a second part of the opposite surface of the supporter, and
the first supporter includes:
a first foam constituting a surface layer part that is in contact with at least one of the radiation detector and the second supporter, and
a second foam constituting a core part that is in contact with the surface layer part in a direction in which the radiation detector and the second supporter are arranged, and
an expansion ratio of the first foam is less than an expansion ratio of the second foam.

19. The radiation detecting device according to claim 17, wherein:
the supporter includes:
a first supporter having the front-facing surface that is in contact with the radiation detector and another surface that is in contact with the rear part, said another surface constituting a first part of the opposite surface of the supporter, and
a second supporter having a surface that is in contact with the first supporter and another surface that is in contact with the rear part, said another surface constituting a second part of the opposite surface of the supporter, and
the second supporter includes
a first foam constituting a surface layer part that extends from the first supporter to the rear part, and
a second foam constituting a core part that is in contact with the surface layer part in a direction in which an inner surface of the rear part extends, and
an expansion ratio of the first foam is less than an expansion ratio of the second foam.

20. The radiation detecting device according to claim 13, wherein the supporter is integrally formed of one piece of foam.

* * * * *